UNITED STATES PATENT OFFICE.

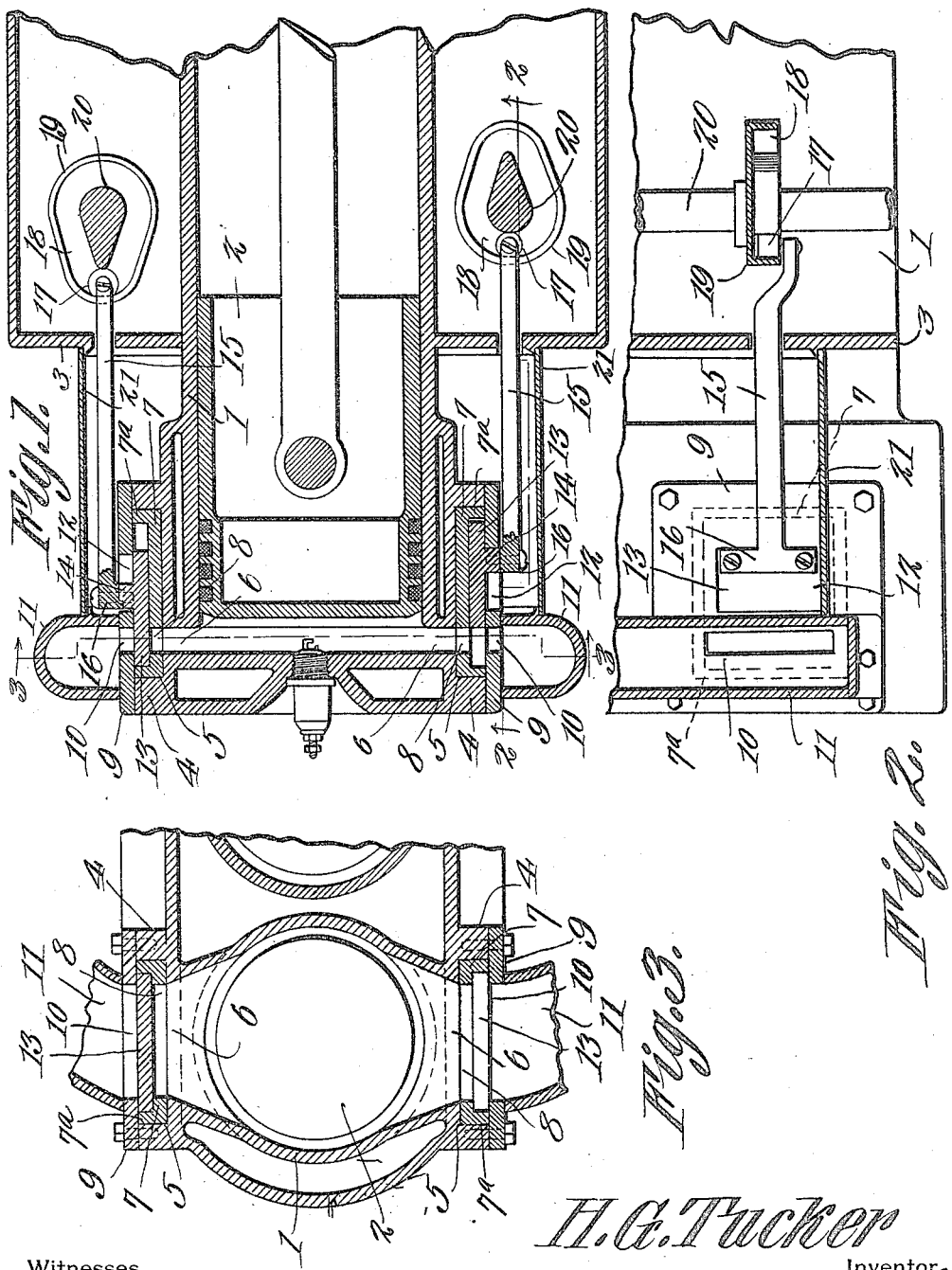

HOLLING GRANT TUCKER, OF CHICAGO, ILLINOIS, ASSIGNOR OF ONE-HALF TO FLOYD BONE, OF CHICAGO, ILLINOIS.

VALVE STRUCTURE FOR EXPLOSIVE-ENGINES.

1,183,329.   Specification of Letters Patent.   Patented May 16, 1916.

Application filed June 3, 1915.   Serial No. 31,911.

*To all whom it may concern:*

Be it known that I, HOLLING G. TUCKER, a citizen of the United States, residing at Chicago, in the county of Cook and State of Illinois, have invented a new and useful Valve Structure for Explosive-Engines, of which the following is a specification.

The present invention appertains to valves of internal combustion engines, and aims to provide a novel and improved valve structure for explosive engines.

It is the object of the invention to provide a valve structure which is self cleaning, which does not require grinding, which is noiseless in operation, which requires but little power to operate, which will not stick or bind, which requires no springs to operate, which has only a small portion exposed to the interior of the cylinder during the explosion, and the parts of which are readily accessible for purpose of repair or replacement when necessary.

As a more specific object, the invention aims to provide unique means for assembling a slide valve with the cylinder of an internal combustion engine, to the ends above noted, and whereby the valve will properly control the respective port of the cylinder.

It is also within the scope of the invention to provide a valve structure having the features above noted, and which at the same time, is comparatively simple, inexpensive, compact and non-encumbering in construction, as well as being thoroughly practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a section through the median plane of one cylinder of an explosive engine, illustrating a pair of the improved valve structures assembled therewith. Fig. 2 is a section on the line 2—2 of Fig. 1. Fig. 3 is a section on the line 3—3 of Fig. 1.

In the drawing, there is illustrated one cylinder 1 of an engine, in which the piston 2 reciprocates, and the numeral 3 designates the crank case.

In carrying out the invention, the cylinder 1 is provided with diametrically opposite longitudinal enlargements or bosses 4 provided with longitudinal rectangular recesses 5, and the cylinder 1 has intake and exhaust ports 6 extending to the recesses 5 between the ends of said recesses, but adjacent the outer ends thereof.

Valve guides 7 of tray-shape are seated snugly within the recesses 5, and are preferably of rectangular contour, the guides 7 having the rims or flanges 7ª extending around their margins, the guides 7 having openings 8 registering with the ports 6.

Plates 9 are bolted or otherwise detachably secured to the faces of the enlargements or bosses 4 over the recesses 5, to clamp the guides 7 within the said recesses. The plates 9 having openings 10 registering with the openings 8 and ports 6, and the plates 9 are utilized for attaching the manifolds 11 to the cylinder, the openings 8 and 10 establishing communication between the ports 6 and the manifolds 11. The plates 9 also have openings 12 outside of the manifolds 11 or spaced inwardly from the openings 10 and within outlines of the flanges 7ª.

Flat valves 13 of rectangular shape are slidable snugly within the guides 7, or between the guides 7 and plates 9, and are provided between their ends with outstanding lugs 14 projecting within the openings 12 of the plates 9. When the valves 13 are moved outwardly, their outer end portions stand between the openings 8 and 10, and when the valves 13 are moved inwardly they will be retracted from between the said openings 8 and 10.

Valve rods 15 have T-heads 16 bolted or otherwise detachably secured to the lugs 14 at the outer sides of the plates 9, the T-heads 16 being located at the outer ends of the valve rods or stems 15. Rollers 17 are carried by the other or inner ends of the rods 15 and work in grooves 18 of cams 19 carried by cam shafts 20. These cam shafts 20 are geared to the crank shaft (not shown) in any suitable manner, whereby the cam shafts are rotated at the proper velocity. The rollers 17 of the valve rods in working within the grooves of the cams will provide a direct drive for the valves, to eliminate the necessity of springs being employed.

The valve structures are preferably inclosed or incased in suitable housings 21. The two valve structures are duplicates of one another, and the cams 19 are so arranged as to open and close the opposite valves alternately, one valve controlling the intake port, and the other valve controlling the exhaust port, according to well known practice. When the cams 19 are rotated, the valve rods 15 will be reciprocated for reciprocating the valves, whereby the valves will be moved properly to closed and opened positions. The valves 13 in sliding between the guides 7 and plates 9 will be cleaned automatically, since the soot or deposits will be sheared off by the edges of the guides 7 and plates 9 formed by the openings 8 and 10, respectively. The valves and their guides or seats 7 and 9 require no grinding, and the valves operate noiselessly. Little effort is necessary for operating the valves, and the valves have very small portions exposed to the interior of the cylinder when the valves are closed during the explosion. The valves are readily accessible, since when the plates 9 are removed, the valves 13 and their guides 7 may be readily removed from the cylinder. The guides 7 provide linings for the recesses 5, and are themselves provided with recesses in which the valves work. The guides 7 may be constructed of suitable wear resisting material. The other advantages and attributes of the present valve structures are thought to be obvious to those skilled in the art without further comment being necessary.

Having thus described the invention, what is claimed as new is:

In a device of the character described, a cylinder having a portion provided with a recess and having a port extending to said recess, a tray-shaped guide fitted in said recess and having a flange around its margin and an opening registering with said port, a valve slidably mounted in said guide, a plate attached to said portion for holding the guide in said recess and for holding the valve in said guide, said plate having an opening registering with the aforesaid opening, said plate having a second opening within the outline of said flange, the valve having a lug working within the second opening, and an actuating member attached to said lug.

In testimony that I claim the foregoing as my own, I have hereto affixed my signature in the presence of two witnesses.

HOLLING GRANT TUCKER.

Witnesses:
CHAS. H. L. HOHMANN,
JACOB HOHMANN.

Copies of this patent may be obtained for five cents each, by addressing the "Commissioner of Patents Washington, D. C."